United States Patent [19]
Cirulli et al.

[11] Patent Number: 5,664,183
[45] Date of Patent: Sep. 2, 1997

[54] APPLICATION OF GROUPWARE TO ISO 9000 REGISTRATION VIA FACILITATED WORK SESSIONS

[75] Inventors: Philip James Cirulli, Endicott; Philip David Heinlein, Binghamton; Byron David James, Johnson City; Deborah Marsh Telfer, Vestal, all of N.Y.

[73] Assignee: International Business Machines Corporation, Armonk, N.Y.

[21] Appl. No.: 466,857

[22] Filed: Jun. 6, 1995

Related U.S. Application Data

[63] Continuation of Ser. No. 229,967, Apr. 19, 1994, abandoned.

[51] Int. Cl.$^6$ ................................................ G06F 17/30
[52] U.S. Cl. .......................... 395/614; 395/610; 395/611; 395/613; 395/615; 364/468.17
[58] Field of Search ............................ 395/600, 425, 395/575, 650, 800, 80; 364/468.17

[56] References Cited

U.S. PATENT DOCUMENTS

| | | | |
|---|---|---|---|
| 4,611,808 | 9/1986 | Palmer | 273/138 A |
| 4,748,678 | 5/1988 | Takeda et al. | 382/56 |
| 4,763,277 | 8/1988 | Ashford et al. | 395/65 |
| 4,912,637 | 3/1990 | Sheedy et al. | 364/300 |
| 4,939,509 | 7/1990 | Bartholomew et al. | 340/717 |
| 4,996,665 | 2/1991 | Nomura | 364/900 |
| 5,008,853 | 4/1991 | Bly et al. | 364/900 |
| 5,050,074 | 9/1991 | Marca | 364/200 |
| 5,062,045 | 10/1991 | Janis et al. | 364/200 |
| 5,133,066 | 7/1992 | Hansen et al. | 395/600 |
| 5,140,676 | 8/1992 | Langelaan | 395/145 |
| 5,146,552 | 9/1992 | Cassorla et al. | 395/145 |
| 5,146,553 | 9/1992 | Noguchi et al. | 395/146 |
| 5,159,669 | 10/1992 | Trigg et al. | 395/159 |
| 5,181,162 | 1/1993 | Smith et al. | 364/419 |
| 5,195,086 | 3/1993 | Baumgartner et al. | 370/62 |
| 5,206,934 | 4/1993 | Naef, III | 395/200 |
| 5,208,748 | 5/1993 | Flores et al. | 364/419 |
| 5,216,604 | 6/1993 | Sakata et al. | 364/419 |
| 5,220,657 | 6/1993 | Bly et al. | 395/425 |
| 5,353,398 | 10/1994 | Kitahara et al. | 395/153 |
| 5,363,507 | 11/1994 | Nakayama et al. | 395/800 |
| 5,379,374 | 1/1995 | Ishizaki et al. | 395/155 |
| 5,442,788 | 8/1995 | Bier | 395/650 |

OTHER PUBLICATIONS

Maeno et al.; "Distributed Desktop Conferencing System (MERMAID) Based on group Communication Architecture.", IEEE, 1991, pp. 18.3.1 –18.3.6.

Gail L. Rein, "Collaboration technology for Organization Design.", IEEE, 1993, pp. 137 –148.

Newman et al. "HICOM: An interactive scientific community.", IEEE, 1990, pp. 2/1 –2/7.

Hayne et al. "A distributed group tool for Issue Analysis.", IEEE, 1990, pp. 325 –327.

Benjamin Martz, Jr. "GroupSystem 4.0 An Electronic Meeting System", IEEE, 1991, pp. 799 –804.

Joseph Valacich, "A Conceptual Framework of Anonymity in Group Support Systems", IEEE, 1992, vol. IV, pp. 101–112.

Jay F. Numamakes, Jr. et al., "Collaboration Technology from Face–to–Face to the Office", IEEE, 1992, pp. 960–967.

(List continued on next page.)

*Primary Examiner*—Thomas G. Black
*Assistant Examiner*—Cheryl Lewis
*Attorney, Agent, or Firm*—Eugene I. Shkurko; Michael E. Belk

[57] ABSTRACT

A network application for automatically formatting and printing documents to be used as training and planning manuals to be used by organizational personnel in preparation for an ISO 9000 audit. The outputted documents can also be educational manuals for dispersing among organizational personnel common information for integrated strategic planning in preparation for the ISO 9000 audit. Facilitated collaborative work sessions among work groups inputting and sharing comments and ideas provide starting data to the network application.

15 Claims, 21 Drawing Sheets

OVERALL CONFIGURATION OF SYSTEM

OTHER PUBLICATIONS

Joline Morrison, "Team Memory: Information; Management for Business Teams.", IEEE, vol. IV, 1993, pp. 122–131.

Linda Harrison, "Designs & tools to augment collaborating learning in compute", IEEE, vol. IV, 1991, pp. 379–385.

Professional Group C5, "CSCW: Computer Supported Co-operative Work," IEE, Colloquien, Oct. 24, 1990, pp. 1/1 –8/4.

FIG.1 OVERALL CONFIGURATION OF SYSTEM

INITIAL STRATEGY SESSION EDUCATION EXERCISE

INITIAL STRATEGY SESSION ORGANIZATIONAL STRUCTURE EXERCISE

INITIAL STRATEGY SESSION PLANNING EXERCISE

WORK PORCEDURE SESSION

Application Development Workstation

* ISOBOOK Bridge Program (produces ISO9000 compliant documents)

Initialize Program Variables

Verify Input Files Exist

Build Title Page
        Write Document Title
        Write Document Revision Level
        Write Date/Time
        Write Document Owner Name and Address Build Document Body
        Start New Page
        Write Level 0 Entry
        For each Comment
            Start New Paragraph
            Write Comment
        For each Level 1 Entry
            Start New Page
            Write Entry Title
            For each Comment
                Start New Paragraph
                Write Comment

FIG.7A

Application Development Workstation

* ISOPLAN Bridge Program (produces ISO9000 comlpiant work plan and import file for Project Management tool)
    Initialize Program Variables
    Verify Input Files Exist
    Build Title Page
        Write Document Title
        Write Document Revision Level
        Write Date/Time
        Write Document Owner Name and Address
    Build Document Body
        Start New Page
        Write Level 0 Entry
        For each Comment
            Start New Paragraph
            Write Comment
        For each Level 1 Entry
            Start New Page
            Write Entry Title
            For each Comment
                Start New Paragraph
                Write Comment

FIG.8A

ISO 9000 Education Package
Revision 1.0

Document Number ISOEDUC.SCR

14 Apr 1994   11:53:34

Document Owner/Approver: Document Owner

Version Notice

This is an on-line controlled document, the master is on-line and supersedes all previous updates. Users should not make unauthorized copies or alterations. User must determine version and completeness prior to use. All deviations of this procedure should be reported to the owner of this document. The user must destroy any obsolete versions and not remove any pages from this printed copy.

SAMPLE OUTPUT FROM EDUCATION SESSION

FIG.9A

CONTENTS

ISO 9000 Education Package ................................................. 3
What is your company's Quality Policy? .................... 3
What is your company's mission statement ? ........... 4
What is ISO 9000 ? ....................................................... 5
What is a Quality System ? ........................................ 6
What are the different ISO Standards ? ..................... 7
What standard will we register to ? .......................... 8
Why are you registering to this ISO std ? ................. 9
What will be the scope of your registration ? .......... 10
What benefits will you get from ISO 9000 ? ............. 11
What are some general rqmts to register ? .............. 12
When do you expect to be registered ? ..................... 13
Who have you picked as a 3rd party registrar ? .... 14
What are the elements of ISO9002 ? ......................... 15
What ISO education do your employees need ? ........ 16
How will your employees get ISO education ? .......... 17
Appendix ......................................................................... 18
Additional ISO9000 Information ................................. 18

FIG.9B

ISO 9000 Education Package

What is your company's Quality Policy ?

Quality Policy

Company XXXXX is committed to
- being a world class contract manufacturer
- providing our customers with total satisfaction
- empowering our employees for excellence

FIG.9C

SAMPLE OUTPUT FROM ORGANIZATION STRUCTURE SESSION

ISO 9000 Work Plan
Revision 1.0

Document Number ISOPLAN. SCR

14 Apr 1994   12:34:52

Document Owner/Approver:   Document Owner

Version Notice

This is an on-line controlled document, the master is on-line and supersedes all previous updates. Users should not make unauthorized copies or alterations. User must determine version and completeness prior to use. All deviations of this procedure should be reported to the owner of this document. The user must destroy any obsolete versions and not remove any pages from this printed copy.

SAMPLE OUTPUT FROM WORK PLAN SESSION

FIG.11A

CONTENTS

| | |
|---|---|
| ISO9000 Work Plan | 3 |
| Company Commitment | 3 |
| Strategy | 4 |
| ISO Training | 5 |
| Audit Strategy | 6 |
| Policy/Procedure/Process Dev/Doc | 7 |
| Policy/Procedure/Process Training | 8 |
| Registration Audit | 9 |
| Master Schedule | 10 |

FIG.11B

ISO9000 Work Plan

Company Commitment

| WORK ITEM | OWNER | TARGET DATE | STATUS |
|---|---|---|---|
| Form Teams and Get Everyone Involved | Company President | 05/21/93 | Open |
| Generate ISO Awarness | Core Team | 05/28/93 | Working |
| Generate Enthusiasm and Management Commitment | Company President | 05/28/93 | Working |
| Allocate Necessary Resources | Company President | 05/28/93 | Open |

FIG.11C

Strategy

| WORK ITEM | OWNER | TARGET DATE | STATUS |
|---|---|---|---|
| Establish Core Team and Other Teams | Core Team | 05/28/93 | Working |
| Post Organizational Chart | Core Team | 05/28/93 | Open |
| Establish Plan (Short and Long Term) | Core Team | 06/11/93 | Working |
| Assign Responsibilities | Core Team, Element Teams | 06/11/93 | Open |
| Develop/Post Milestones | Core Team | 05/28/93 | Working |
| Tracking of Progress on ISO9000 | Core Team | On-Going | Working |

FIG.11D

ISO 9000 Quality Manual
Revision 1.0

Document Number ISOBOOK.SCR

14 Apr 1994   10:15:19

Document Owner/Approver:   Document Owner

Version Notice

This is an on-line controlled document, the master is on-line and supersedes all previous updates. Users should not make unauthorized copies or alterations. User must determine version and completeness prior to use. All deviations of this procedure should be reported to the owner of this document. The user must destroy any obsolete versions and not remove any pages from this printed copy.

SAMPLE OUTPUT FROM MANUAL PROCEDURE SESSION

FIG.12A

ISO 9000 Quality Manual
Scope and Field of Application

SCOPE

This quality manual applies to all products and services covered under the scope of IS 900x registration. It establishes the quality system requirements when a contract between two parties requires a demonstration of company XXXX's capability to control the processes that determine acceptability of product shipped.

FIG.12C

CONTENTS

| | |
|---|---|
| ISO 9000 Quality Manual | 3 |
| Scope and Field of Application | 3 |
|   Scope | 3 |
|   Field of Application | 4 |
| References | 5 |
|   Management Responsibilities | 5 |
|   Quality System | 6 |
|   Contract Review | 7 |
|   Design Control | 8 |
| Document Control | 9 |
|   Purchasing | 10 |
|   Purchaser-Supplied Product | 11 |
|   Pruduct Identification and Traceability | 12 |
|   Process Control | 13 |
|   Inspection and Testing | 14 |
|   Inspection, Measuring, and Test Equipment | 15 |
|   Inspection and Test Status | 16 |
|   Control of Nonconforming Material and Product | 17 |
|   Corrective Action | 18 |
|   Handling, Storage, Packaging, and Delivery | 19 |
|   Quality Records | 20 |
|   Internal Quality Audits | 21 |
|   Training | 22 |
|   Product Servicing | 23 |
|   Statistical Techniques | 24 |
| Definitions | 25 |
|   Quality Policy | 25 |
|   Organization | 26 |
|   Management Review | 27 |
| Quality System Requirements | 28 |

FIG.12B

Internal Audit Procedure
Revision 1.0

Document Number ISOAUDIT.SCR

14 Apr 1994   12:04:49

Document Owner/Approver:   Document Owner

Version Notice

This is an on-line controlled document, the master is on-line and supersedes all previous updates. Users should not make unauthorized copies or alterations. User must determine version and completeness prior to use. All deviations of this procedure should be reported to the owner of this document. The user must destroy any obsolete versions and not remove any pages from this printed copy.

SAMPLE OUTPUT FROM WORK INSTRUCTION SESSION

FIG.13A

CONTENTS

Internal Audit Procedure .................. 3
Document Controls ......................... 3
   Change Summary ........................ 3
   Signoffs .............................. 3
      Reference Document Number:
      2-XXXXXXXXXX ..................... 3
   Revision History ...................... 4
Procedures ................................ 5
   Introduction .......................... 5
   Responsibilities ...................... 6
   Audit Prerequisites ................... 7
   Notification of Internal Audit ........ 8
   Preaudit Conference ................... 9
   Conducting the Audit .................. 10
   Developing the Audit Report ........... 11
   Management Review of Findings ......... 12
   Roll-up of Audit Findings ............. 13
   Follow-up Audit ....................... 14
Forms ..................................... 15
   Audit Form Responsibility ............. 15
   Internal Audit Schedule ............... 16
      Reference Document Number:____ .. 16
   Nonconformance Report ................. 18
      Reference Document Number:____ .. 18
   Audit Discrepancy Report .............. 20
      Reference Document Number:____ .. 20

FIG.13B

Internal Audit Procedure

Document Controls

CHANGE SUMMARY

Procedure changes that result in document revisions will be summarized in this section in reverse chronological sequence. Revision bars (|) will highlight the text changed in new documents versions.

| Revisions: | Change Date: | By Whom: | Change Description: |
|---|---|---|---|
| 1.0 | 05/13/93 | ISO Core Team | Initial Version |

SIGNOFFS

Reference Document Number: 2-XXXXXXXX    Internal Quality Audit Procedure

Sign-off for: Internal Quality Audit Procedure

FIG.13C

|                          | Signature | Date |
|--------------------------|-----------|------|
| ■ Manufacturing Mgr      | _____ | _____ |
| ■ Human Resources Mgr    | _____ | _____ |
| ■ General Manager        | _____ | _____ |
| ■ Test Mgr               | _____ | _____ |
| ■ Quality Mgr            | _____ | _____ |
| ■ Purchasing Mgr         | _____ | _____ |
| ■ Materials Mgr          | _____ | _____ |
| ■ SMT Engineering Mgr    | _____ | _____ |
| ■ THT Engineering Mgr    | _____ | _____ |

FIG.13D

APPLICATION OF GROUPWARE TO ISO 9000 REGISTRATION VIA FACILITATED WORK SESSIONS

The application is a continuation, of application Ser. No. 08/229,967, filed Apr. 19, 1994 and now abandoned.

BACKGROUND OF THE INVENTION

1. Technical Field

This invention relates to a computer network application for sharing, combining, formatting, and printing into a predetermined document format information gathered from a number of users or work groups formed within an organization to register the organization under ISO 9000, in a networked, multi-user environment. In particular, this invention effectuates the documentation of business process systems via facilitated computer-based, cooperative work sessions, thereby streamlining the registration process for ISO 9000.

2. Description of the Prior Art

ISO 9000 is a set of five international standards for certifying an organization's Quality Assurance Management System. The standards outline the requirements for certifiably establishing, documenting, and maintaining an effective quality system. These standards are published by the American National Standards Institute, Inc., which has joined other nations in adopting standards fully consistent with the ISO 9000–9004 series of quality assurance standards, in the following documents:

(ISO 9000) ANSI/ASQC Q90-1987, Quality Management and Quality Assurance Standards—Guidelines for Selection and Use.

(ISO 9001) ANSI/ASQC Q91-1987, Quality Systems—Model for Quality Assurance in Design/Development, Production, Installation and Serving.

(ISO 9002) ANSI/ASQC Q92-1987, Quality Systems—Model for Quality Assurance in Production and Installation.

(ISO 9003) ANSI/ASQC Q93-1987, Quality Systems—Model for Quality Assurance in Final Inspection and Test.

(ISO 9004) ANSI/ASQC Q94-1987, Quality Management and Quality System Elements—Guidelines (ISO 9004-2) ISO 9004-2-1991, Quality Management and Quality System Elements—Guidelines for SERVICES ANSI is American National Standards Institute; ASQC is American Society for Quality Control; ISO is the International Standards Organization.

Business organizations are registered through an audit process conducted by a third party registration body. The present invention is addressed to the development of an organization's quality management system in preparation for such an audit. Many worldwide businesses today have recently been registered or are working toward registration. Various business and government organizations in Europe are requiring ISO 9000 registration as a requirement for doing business in any manner or form on the continent.

ISO 9000 registration is a difficult and time-consuming process for any organization. The typical approach is to assign individuals or groups of people to selected ISO 9000 requirements. The individuals or groups manually go about the task of documenting processes and procedures in a traditional manner, such as with individual workstations or PC's followed by an integration of collected data overseen by a project manager. This requires many iterations and reviews before a final version of a quality assurance program is complete because of the simultaneous and scattered efforts taking place within the organization. The organization is then audited for compliance to an approved procedure. Every person affected by the procedure must be able to access the current version of the documented procedure, understand it, and follow it.

Groupware refers to computer applications that allow groups of people to work together through the sharing of information. Most groupware products provide one or more of the following functions: Calendar, Electronic Mail, Word Processing, Data or Document Management, and Group Decision Support. Groupware products, such as LotusNotes, all run on a network so that information is easily shared and accessible to all network users who need it.

SUMMARY OF THE INVENTION

This invention comprises a network application for manipulating information gathered in a multi-user collaborative environment to prepare ISO 9000 conforming documents. The information gathered in the multi-user environment includes input such as comments and ideas from group participants. These are input into computer storage to be accessed by special groupware applications for formatting and printing in predefined formats. Educational manuals, work procedures, management planning documents, and quality manuals can be programmed for automatic output. User intervention is unnecessary after the information gathering session and before the printing of the document.

The participants in the information gathering session are prompted for answers to prepared questions. Networked PC's and workstations facilitate the information gathering among the work groups, group editing of the data gathered, and group approval of the final edited group response to the questions. Commercially available groupware tools also facilitate the information gathering session as well as storing group responses using document management software for continuous updating and sharing of the output documents.

Other features and advantages of this invention will become apparent from the following detailed description of the presently preferred embodiment of the invention, taken in conjunction with the accompanying drawings.

A multi-user, networked collaborative system is a more efficient method for tackling the ISO 9000 registration task, however, there must be a utility that permits users to participate simultaneously and share information relative to their participation in the registration process. The shared information must be put into an easily workable format useable by everyone involved in education, plan management, status checking, and quality system documentation. Facilitated work sessions using groupware tools were developed in response to this need.

BRIEF DESCRIPTION OF THE DRAWINGS

FIG. 9 is a sample output of the education session.

FIG. 11 is a sample output of the planning session.

FIG. 12 is a sample output of the manual procedure session.

FIG. 13 is a sample output of the work procedure session.

DESCRIPTION OF THE PREFERRED EMBODIMENT

Overview

Since ISO 9000 registration is usually a new and unfamiliar process to the organization, it is difficult for the organization to get started. Decisions need to be made on how to approach the tasks, on how to educate all personnel on ISO 9000 and their role in it, and on how to proceed quickly to prepare for the audit required before registration. Once registration activities are underway and procedures are documented, difficulties still exist. Documents can get out of date easily if they are not updated as procedures change. Documents can also get out of date if the latest revision is not properly distributed to all affected personnel. Even after registration is achieved, the work is not done. Independent auditors will return every 6 months to ensure that the organization remains in compliance and keeps its registration.

The experience of a number of American businesses that have achieved ISO 9000 shows that it typically takes 12 to 18 months to get registered. The use of groupware tools will allow employees to work more efficiently and productively, thereby decreasing the amount of time required to get registered. With the right methodology and tools, the time can effectively be cut in half.

The approach to ISO 9000 described here is being used successfully in IBM. IBM's groupware product, TeamFocus, is used in facilitated work sessions for ISO 9000. TeamFocus is a groupware product that provides group decision support functions such as:

Electronic Brainstorming
Idea Organization
Voting
Topic Commenting
Alternative Evaluation
Group Outlining
Group Writing
Group Matrix Following the facilitated sessions the resulting documents are stored in another groupware tool, LotusNotes. LotusNotes is a groupware product that provides document management functions for an organization.

Initial Strategy Session

This facilitated session takes the team through a series of questions that are designed to give them a common understanding of ISO 9000 standards and their elements. It also takes them through the basic decisions that must be made to get started, such as scope, timing, and resource commitment. The decisions are made by the group and edited in their own words then stored. The responses are organization-specific.

Figure 1:
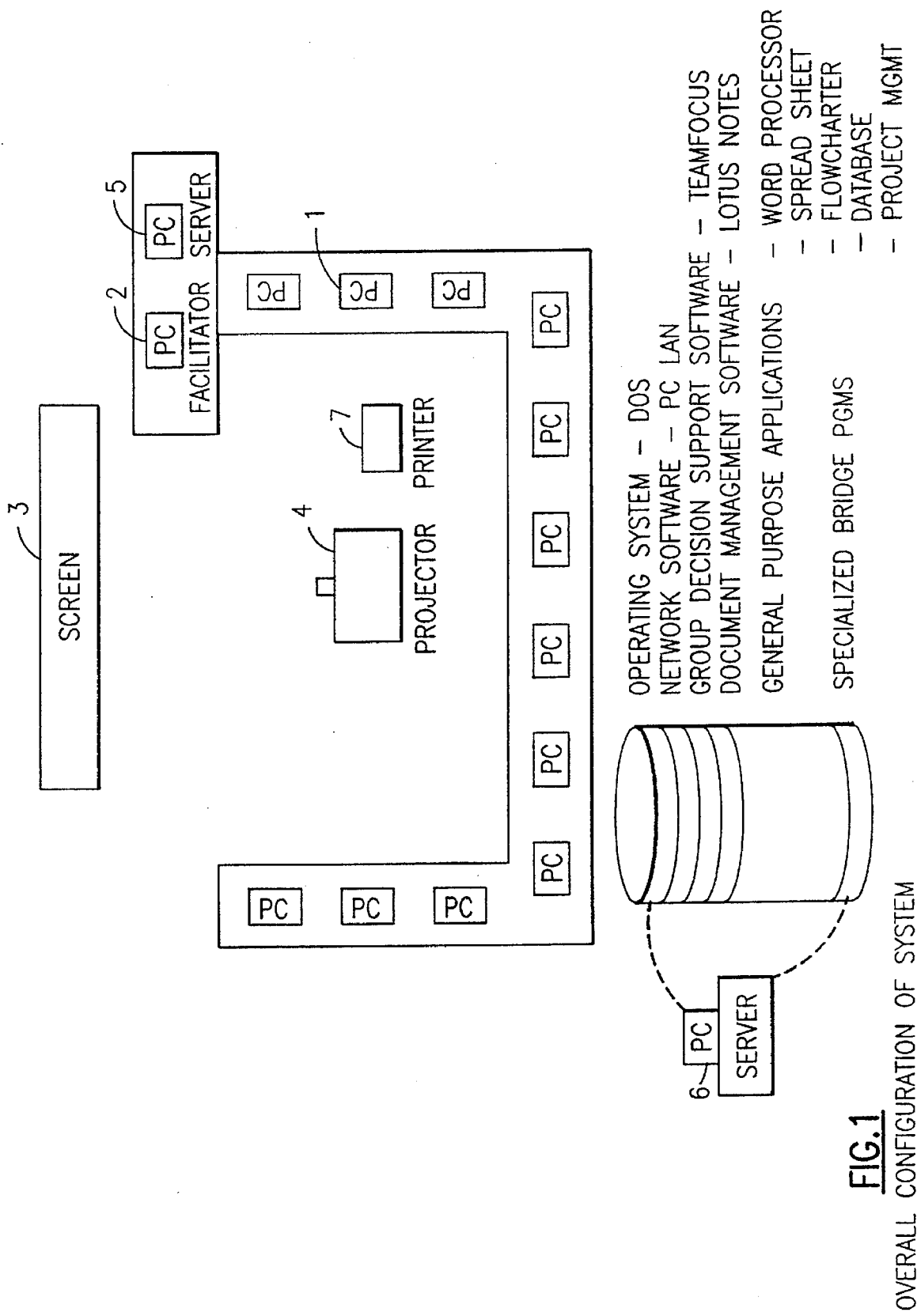
FIG. 1 is an example layout of a workroom for conducting an information gathering session and the layers of control in the PC server.

Referring to FIG. 1, the workgroup gathers in a joint meeting to provide input to a series of questions provided by a facilitator, shown as a PC 2 in FIG. 1. The PC server 5 operating system 6 and applications 6 are also shown. The session system can also include a projector/screen 4/3, a printer 7, etc. Each workgroup member participates in the meeting via a PC 1 and the questions may be selectively displayed on the screen or on each PC.

Figure 2:
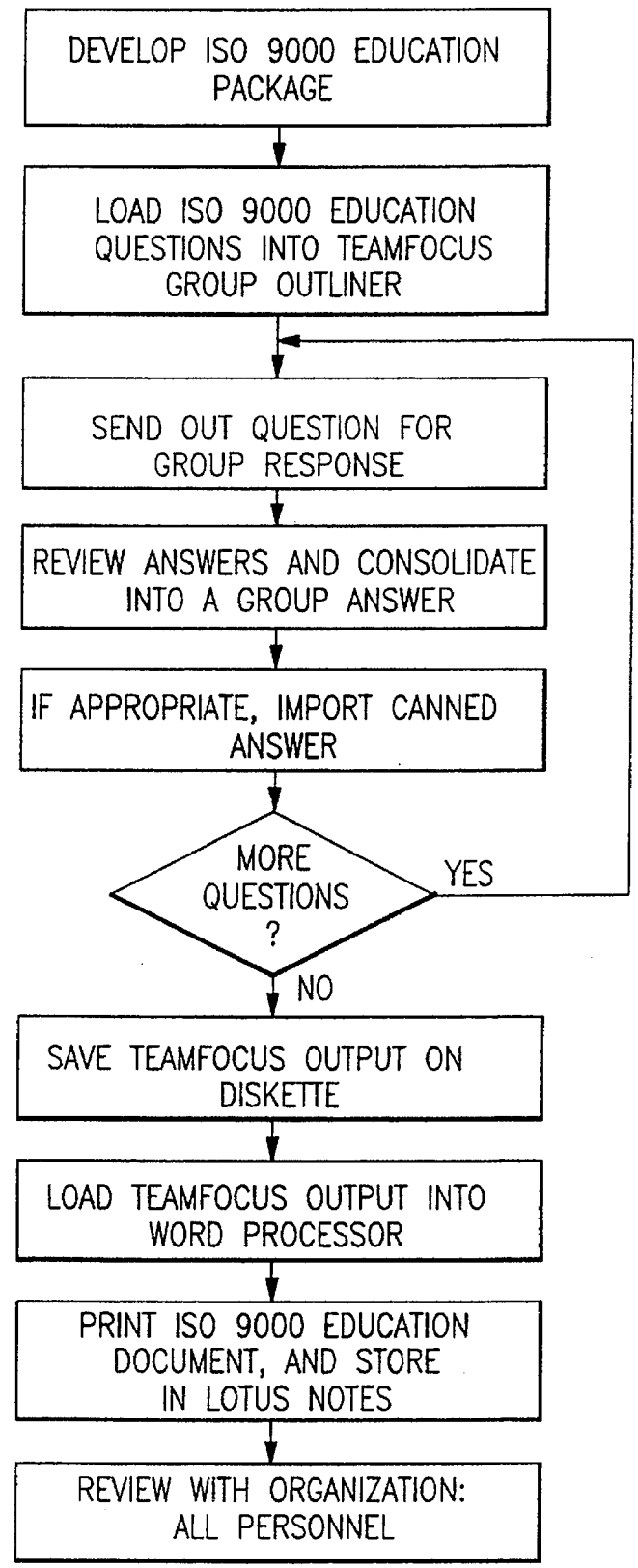
FIG. 2 is a flowchart of the steps for conducting the initial strategy educational exercise.

Referring to FIG. 2, the initial strategy session educational exercise is prepared for the organization's participants. The system displays the questions to the participants and a groupware tool such as TeamFocus is used to capture the group's responses and document their decisions. As an example, the facilitator's questions can be as follows:

What is your company's quality policy?
What is your company's mission statement?
What is ISO 9000?
What is a quality system?
What are the different ISO standards?
What standard will we register to?
Why are you registering to this ISO standard?
What will be the scope of your registration?
What benefits will you get from ISO 9000?
What are some general requirements to register?
When do you expect to be registered?
Who have you picked as a 3rd party registrar?
What are the elements of ISO 9002?
What ISO education do your employees need?
How will your employees get ISO education?

The group responses are displayed on a screen visible to the entire group and the responses can be edited until an agreed final version is complete through group discussion and further input. The responses are captured in the group's own words, although canned answers stored on the system can be substituted for questions that the group cannot answer due to lack of knowledge about ISO 9000. If the group cannot answer the question, a predefined answer can be imported and modified as needed. The facilitator can provide interpretation and instruction as needed, since ISO 9000 may be unfamiliar to some of the participants. This continues until all the questions have been answered. The TeamFocus session output is copied to diskette and loaded into a word processor. The session output can either be formatted in the word processor tool or in a specialized program. In either case, a document is automatically created and printed out for the participants. The document is also stored in another groupware tool called LotusNotes where it can be accessed by others in the organization. The Education Package is reviewed with all personnel in the organization so that a common understanding and awareness of ISO 9000 is attained.

Figure 3:
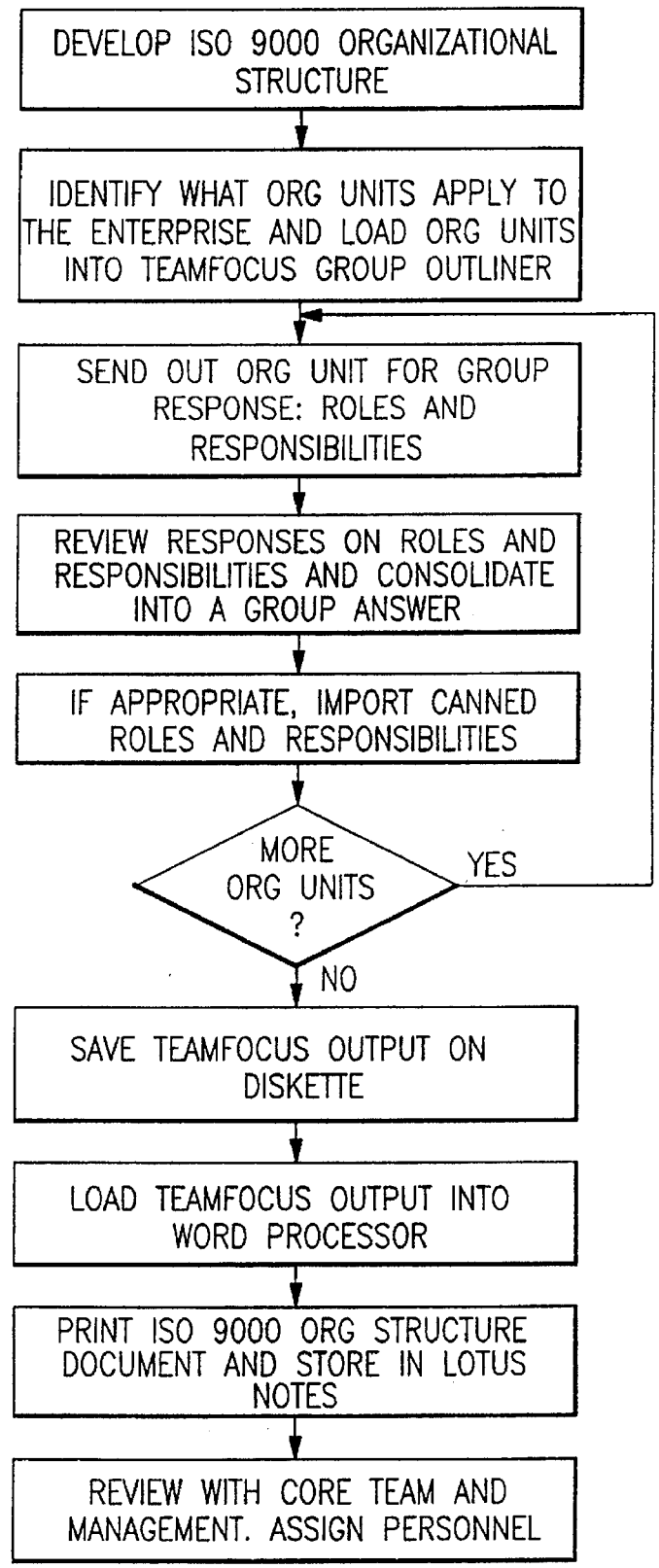
FIG. 3 is a flowchart of the steps for conducting the initial strategy organizational structure exercise.

Referring to FIG. 3, the Organizational Structure Exercise in the Initial Strategy Session identifies the organizational units within the organization and documents the roles and responsibilities of each. The session starts with a list of organizational units that others have put in place to achieve ISO 9000. These may include management reps, core teams, element teams, and department deputies, etc. After some discussion, the participants decide which organizational units are required by their organization and these are loaded into TeamFocus in the Group Outliner tool. The organizational units are sent out to the group one at a time. Each member of the group suggests roles and responsibilities for that organizational unit. The Group Outliner tool in TeamFocus allows each participant to view the other participant's suggestions. When everyone has responded, the suggestions are reviewed and consolidated into a group definition of the roles and responsibilities for that organizational unit. All participants must concur with the group definition. If the group cannot define the responsibilities, a predefined set of responsibilities can be imported and modified as needed. The facilitator can provide interpretation and instruction as needed, since ISO 9000 may be unfamiliar to some of the participants. This continues until all the organizational units have been addressed. The TeamFocus session output is copied to diskette and loaded into a word processor. The session output can either be formatted in the word processor tool or in a specialized program. In either case, a document is automatically created and printed out for the participants. The document is also stored in another groupware tool called LotusNotes where it can be accessed by others in the organization. The Organizational Structure and roles and responsibilities show what the various teams must do and how they will interact with respect to ISO 9000 activities.

Figure 4:
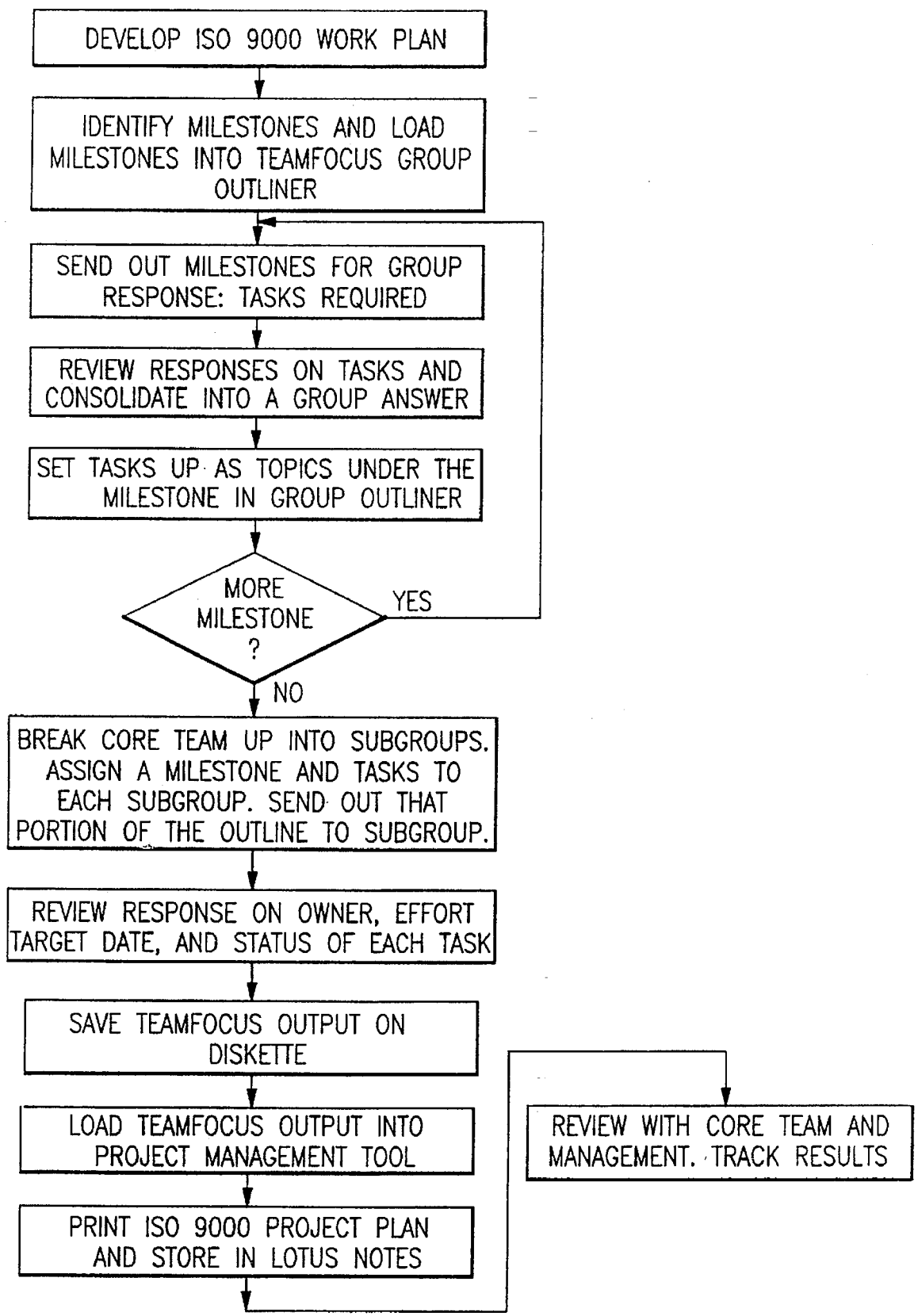
FIG. 4 is a flowchart of the steps for conducting the initial strategy planning exercise.

Referring to FIG. 4, the Planning Exercise in the Initial Strategy Session identifies all the activities that must be accomplished in order to achieve ISO 9000. The session starts with a list of milestones that typically have to be met in order to achieve ISO 9000. These may include education, documentation, training, audit readiness, etc. After some discussion, an approximate time line is established for the various milestones and then the milestones are loaded into TeamFocus in the Group Outliner tool. The milestones are sent out to the group one at a time. Each member of the group suggests activities that must be accomplished to complete that milestone. The Group Outliner tool in TeamFocus allows each participant to view the other participant's suggestions. When everyone has responded, the suggestions are reviewed and consolidated into a group list of activities for that milestone. All participants must concur with the group list of activities. If the group cannot define the activities, a predefined set of activities can be imported and modified as needed. The facilitator can provide interpretation and instruction as needed, since ISO 9000 may be unfamiliar to some of the participants. This continues until all the milestones have been addressed. At this time, the participants are divided into subgroups and each subgroup is assigned one or more milestones to work on. Each subgroup is sent the list of activities for their respective milestones using TeamFocus Group Outliner tool. The subgroup identifies an owner, effort estimate, target date, and status for each activity. The responses are reviewed with the entire group for concurrence. The TeamFocus session output is copied to diskette and loaded into a project management tool. The session output can either be formatted in the project management tool or in a specialized program. In either case, a master work plan is automatically created and printed out for the participants. The work plan document is also stored in another groupware tool called LotusNotes where it can be accessed by others in the organization. The Master Work Plan is reviewed with Management and used to track progress toward ISO 9000.

Figure 5:
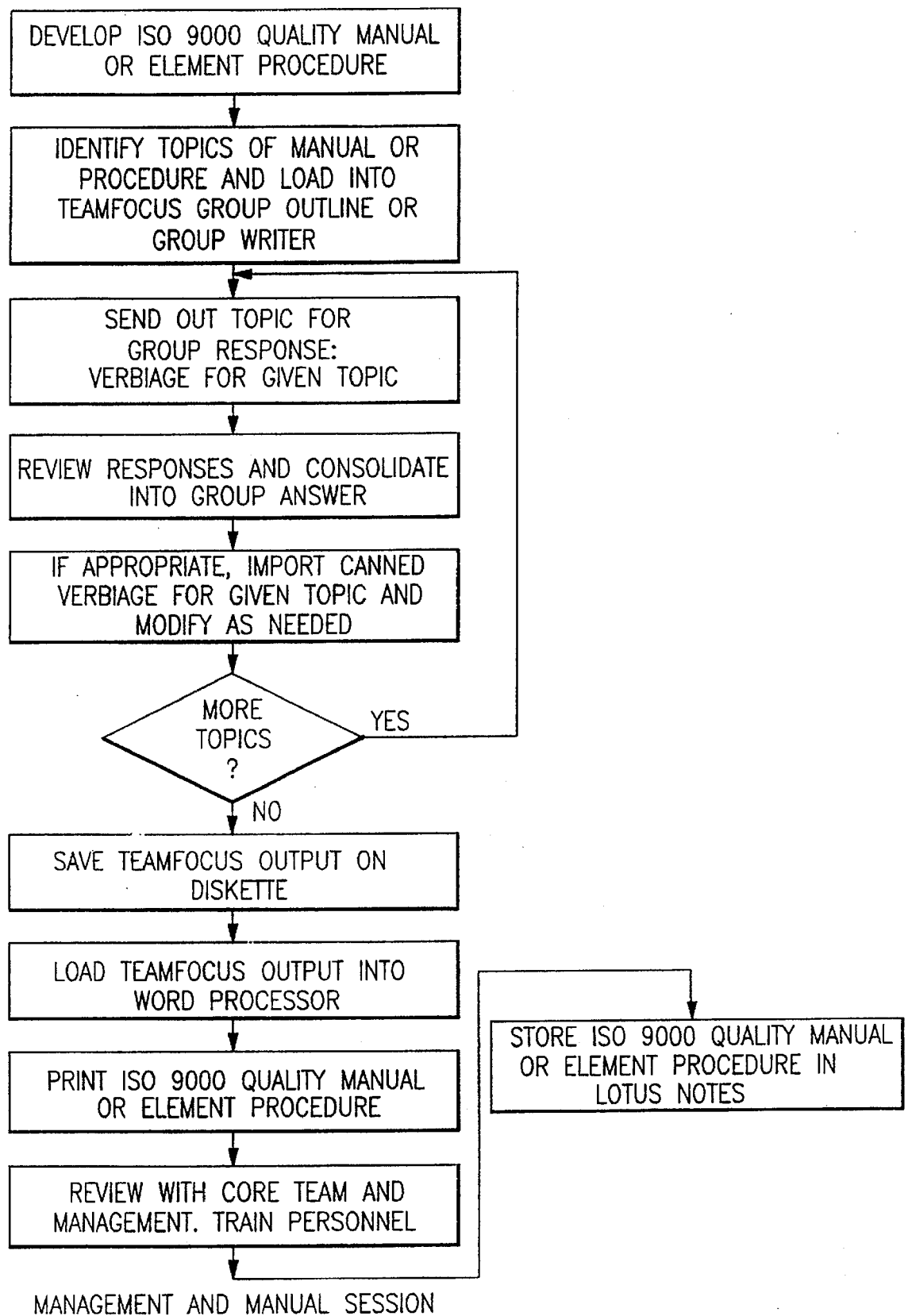
FIG. 5 is a flowchart of the steps for conducting the element and manual exercise.

Referring to FIG. 5, the Element and Manual Session develops an ISO 9000 Quality Manual or Element Procedures. The session starts with a list of topics that are needed in the manual or procedure. These may include document controls, revision history, elements or procedure steps, forms, reference material, etc. After some discussion, the participants decide which topics are required by their organization and these are loaded into TeamFocus in the Group Outliner or Group Writer tool. The topics are sent out to the group one at a time. Each member of the group suggests verbiage for that topic. The Group Outliner and Group Writer tools in TeamFocus allows each participant to view the other participant's suggestions. When everyone has responded, the suggestions are reviewed and consolidated into a group response for that topic. All participants must concur with the group response. If the group cannot develop a response for the topic, a predefined response can be imported and modified as needed. The facilitator can provide interpretation and instruction as needed, since ISO 9000 may be unfamiliar to some of the participants. This continues until all the topics have been addressed. The TeamFocus session output is copied to diskette and loaded into a word processor. The session output can either be formatted in the word processor tool or in a specialized program. In either case, a document is created and printed out for the participants. The document is also stored in another groupware tool called LotusNotes where it can be accessed by others in the organization. The Quality Manual and Element Procedures show how the organization meets the requirements of the ISO 9000 standard.

Figure 6:
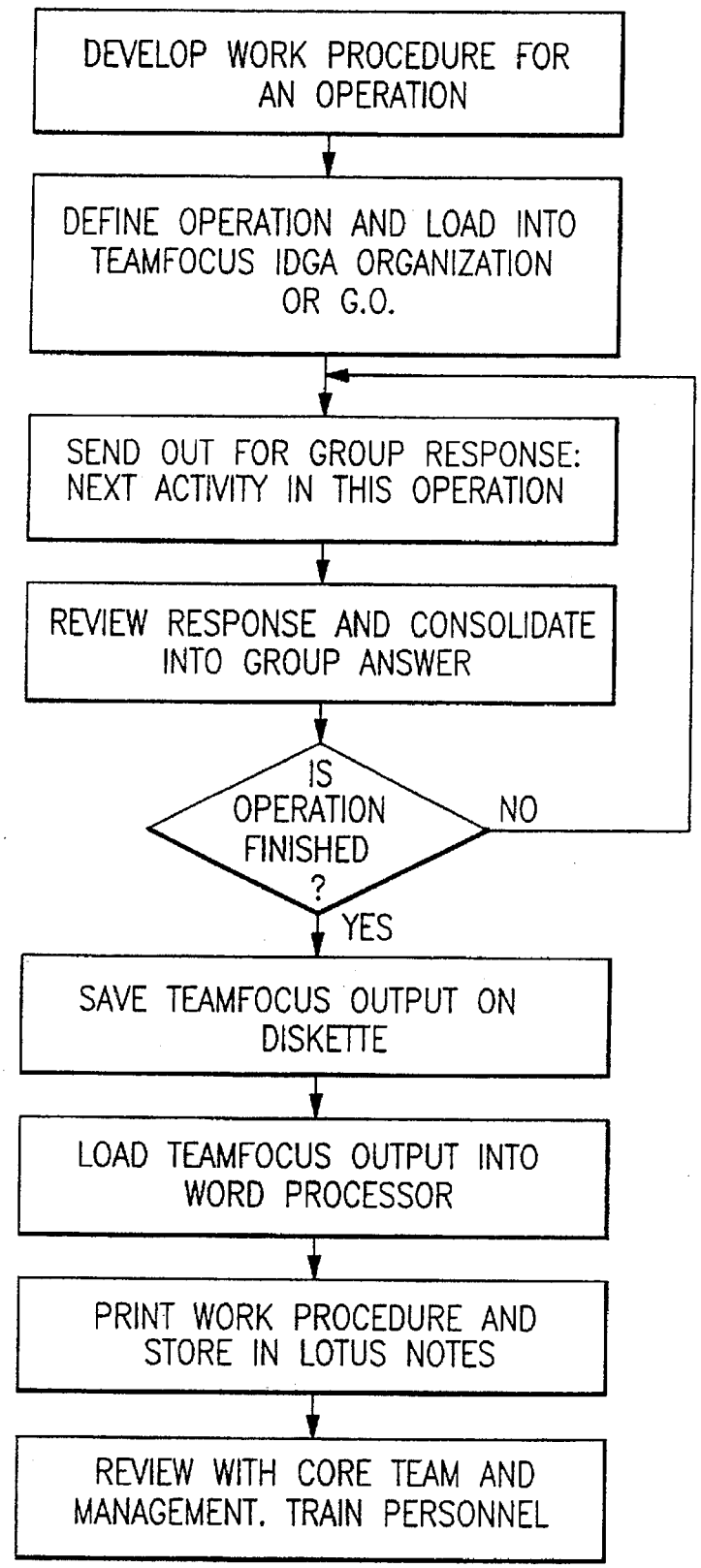
FIG. 6 is a flowchart of the steps for conducting the work procedure exercise.

The Work Procedure Session develops a written work procedure for an operation. Referring to FIG. 6, the session starts with a definition of the operation that is loaded into TeamFocus in the Group Outliner or Idea Organization tool. The group is then asked to identify the first step in this operation. Each member of the group suggests an activity. The Group Outliner and Idea Organization tools in TeamFocus allows each participant to view the other participant's suggestions. When everyone has responded, the suggestions are reviewed, duplicate removed, and similar activities merged together. The resulting activities are then sequenced. All participants must concur with the sequence established by the group. The group is then asked to identify the next step in this operation. This continues until all the activities have been identified and sequenced. The group can then provide verbiage that describes how each activity is accomplished, either working in subgroups or all together. When this is completed, the TeamFocus session output is copied to diskette and loaded into a word processor. The session output can either be formatted in the word processor tool or in a specialized program. In either case, a document is created and printed out for the participants. The document is also stored in another groupware tool called LotusNotes where it can be accessed by others in the organization. Work Procedure sessions document repetitive processes used within the organization. These facilitated sessions document the organization's work procedures for performing the process. The work procedure defines the responsibilities of employees for this process. Audits may be conducted to ensure that the procedure is routinely followed. The Work Procedure documents how the organization performs an operation. The Work Procedures can be used for training and for auditing.

The facilitated work sessions serve several purposes. The participants become a core team that drives the organization toward ISO 9000. The key decisions needed to proceed are made and documented, and have the consensus of all the core team members. All core team members are focused and working toward a common objective, and one to which they all buy into. The groupware tools used in the facilitated session provide immediate documentation of the decisions of the core team and ensure that everything is documented in the words of the team members.

A groupware tool is used to collect and document the team's responses. Everything is captured in the team's own words, although canned verbiage can be substituted for sections that the group cannot answer due to lack of consistency in their current procedures. The canned verbiage gives them a starting point that they can easily modify to fit their own specific needs. A specialized bridge tool automatically converts the groupware tool output into hard and soft copy documents in a word processor or document management product. This document becomes a reference for the rest of the organization.

These facilitated work sessions ensure that required documents are produced in an efficient manner. Instead of the usual iterations and reviews by committee, the document is written correctly the first time and agreed to by all participants. The specialized bridge tool ensures that this resulting document is compliant with ISO 9000 document controls.

The Bridge Tool

The TeamFocus sessions produces data files comprised of all the groups' responses to the facilitator's prompts. Upon execution of the bridge tool these files are formatted into usable documents such as educational manuals, element and quality manuals, and work procedures. Also, the files can be formatted to print plan management manuals for the organization to follow in preparation for the ISO 9000 registration audit. A networked document management application, such as LotusNotes, is used to maintain and update current versions of the various documents and manuals, as well as to share this information throughout the organization.

Figure 7B:
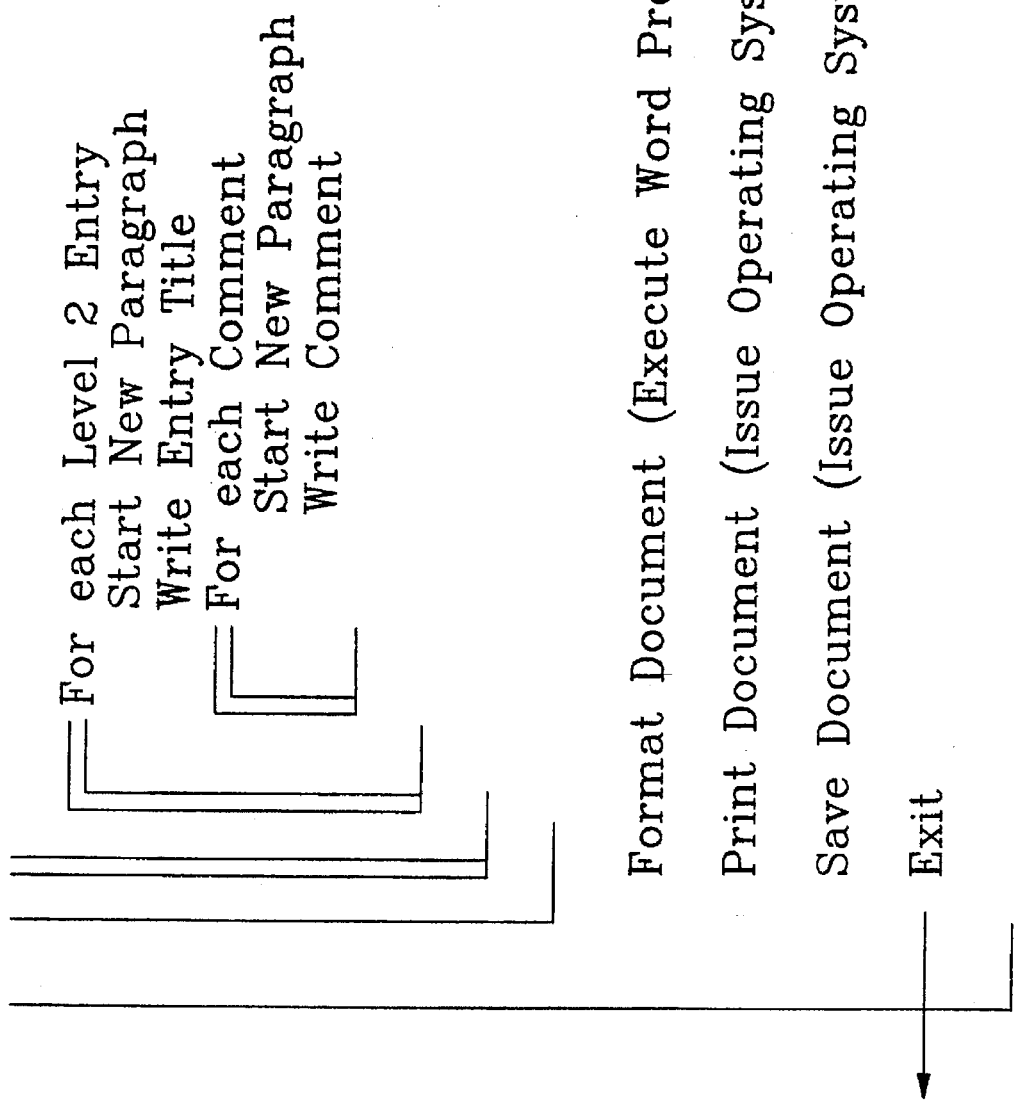
FIG. 7 is a pseudocode implementation of the method used in the educational, element and manual, and work procedure exercises.

Referring to FIG. 7 showing a pseudocode implementation of the bridge tool ISOBOOK, this specialized program used by IBM bridges the output from TeamFocus into an IBM word processing format called BookMaster. The program initializes program variables and checks to make sure the TeamFocus files exist. The TeamFocus files are of 3 types: one showing the overall structure, another type for each of the level entries, and another type for the comments associated with each of the level entries. The ISOBOOK program first constructs a title page for the document. It uses the TeamFocus session name as the document title, and prompts for the name of the document owner. It also writes the current system date and time on the document title page, as well as an initial revision level of 1.0. The standard BookMaster title tags, ":title.", ":docnum.", "date.", and ":author.", are used here. Next, the ISOBOOK program constructs the body of the document by writing out the TeamFocus files, starting with the level 0 entry and its associated comment file. The level 0 entry is given a ":h1." tag to indicate that it is the highest level heading in the document. Then it starts a new page by issuing a ".pa" tag and writes out the first level 1 entry and its associated comment file. The level 1 entry is given a ":h2." tag to indicate that it is the second highest level heading in the document. Each individual comment in the comment file is treated as a separate paragraph by preceding it with a ":p." tag. If there are level 2 entries, it next writes out each level 2 entry and its associated comment file as before. Each level 2 entry is given a ":h3." tag to indicate that it is the third highest level heading in the document. Then it starts a new page by issuing a ".pa" tag and writes out the next level 1 entry and its associated comment file. This continues until all of the level 1 entries have been written. At this point, the ISOBOOK program calls the BookMaster executable program to format the document using the above arranged tags and text. The document is sent to the printer and the file is copied to a designated output directory.

Figure 8B:
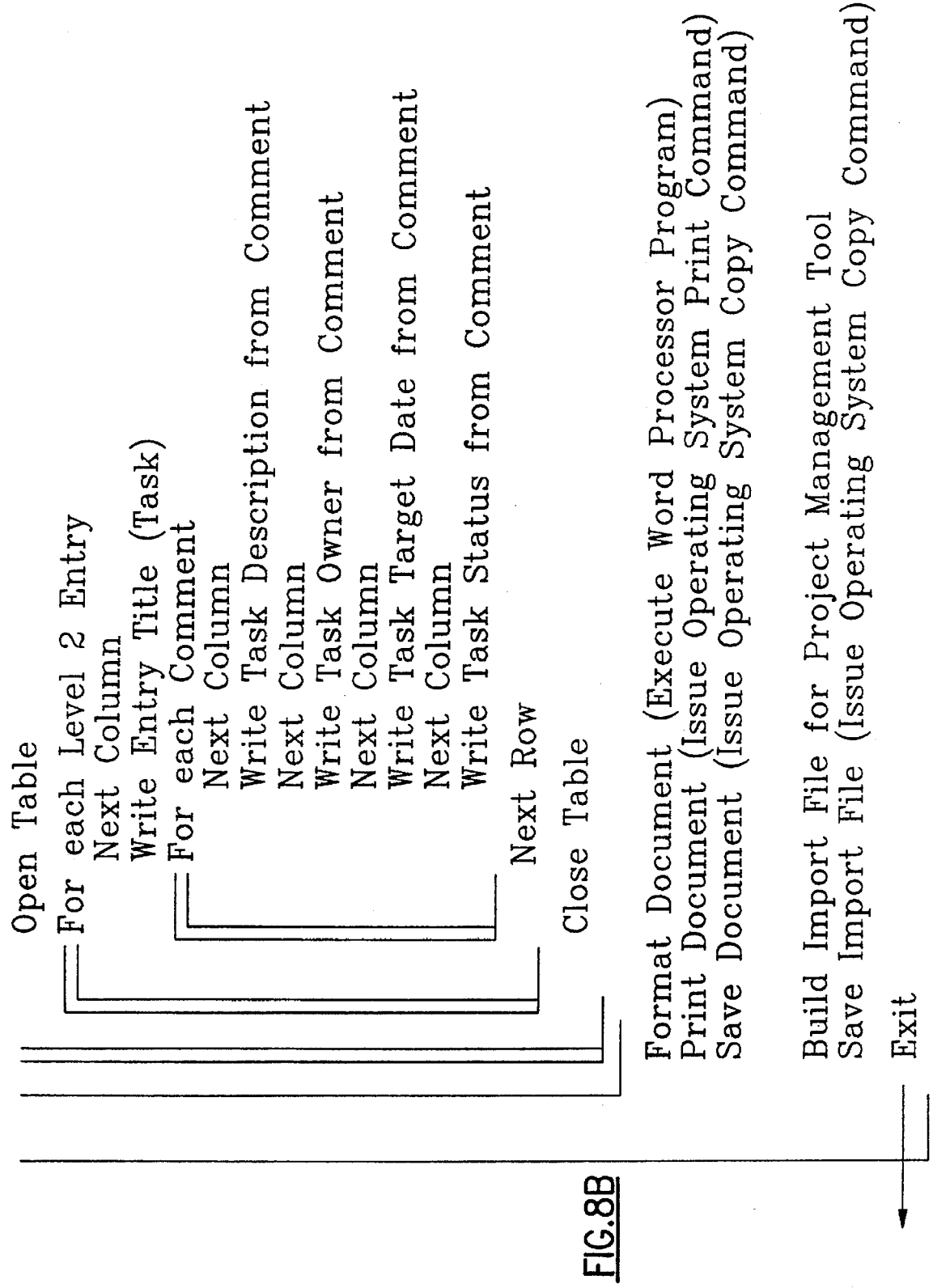
FIG. 8 is a pseudocode implementation of the method used in the planning exercise.
Figure 10:
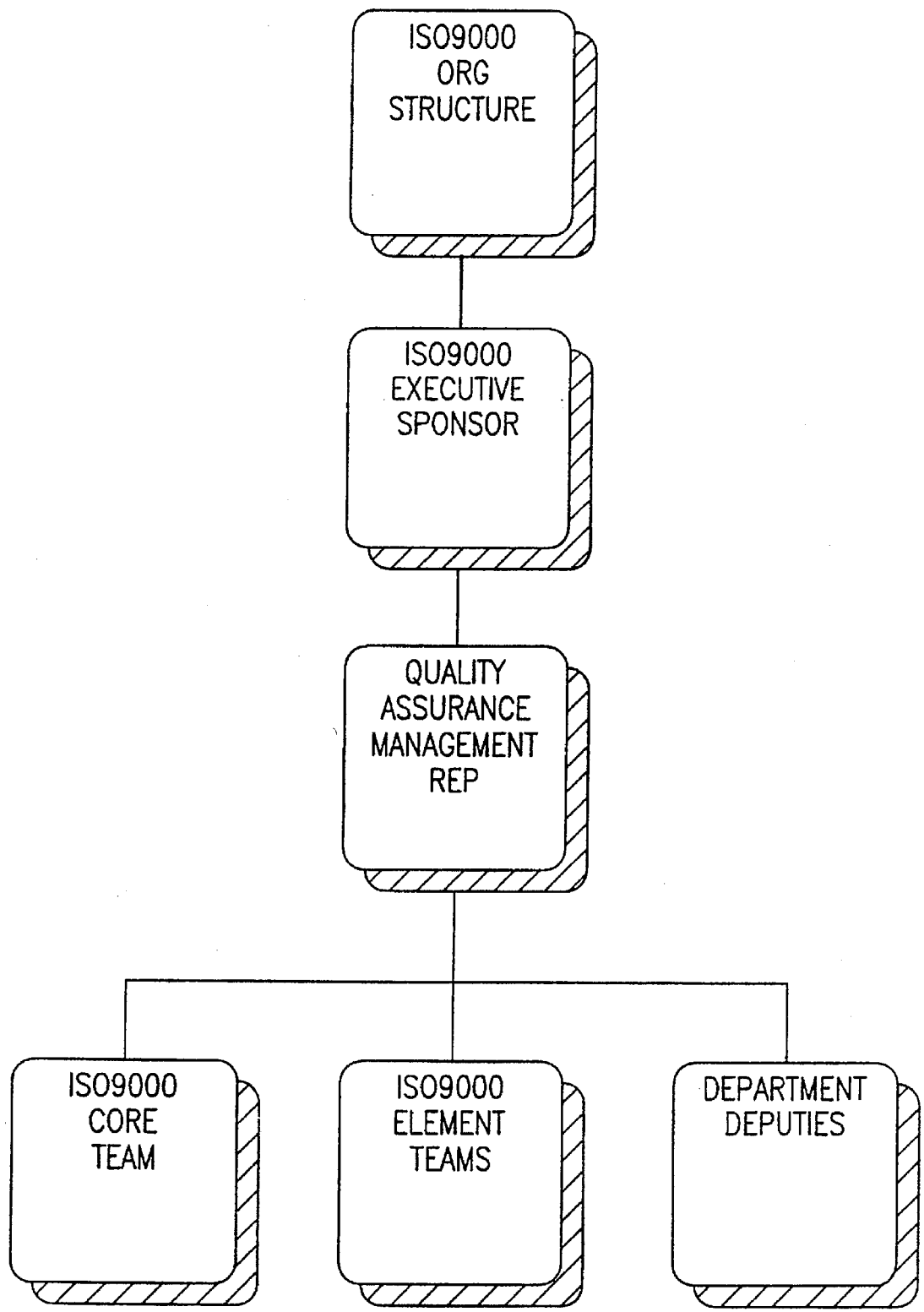
FIG. 10 is a sample output of the organizational structure session.

Referring to the pseudocode shown in FIG. 8, this specialized program ISOPLAN used by IBM bridges the output from TeamFocus into an IBM word processing format called BookMaster. The program initializes program variables and checks to make sure the TeamFocus files exist. The TeamFocus files are of 3 types: one showing the overall structure, another type for each of the level entries, and another type for the comments associated with each of the level entries. The ISOPLAN program first constructs a title page for the document. It uses the TeamFocus session name as the document title, and prompts for the name of the document owner. It also writes the current system date and time on the document title page, as well as an initial revision level of 1.0. The standard BookMaster title tags, ":title.", ":docnum.", "date.", and ":author.", are used here. Next, the ISOPLAN program constructs the body of the project plan document by writing out the TeamFocus files in a table format, starting with the level 0 entry and its associated comment file. The level 0 entry is given a ":h1." tag to indicate that it is the highest level heading in the document. Then it starts a new page by issuing a ".pa" tag and writes out the first level 1 entry and its associated comment file.

The level 1 entry is given a ":h2." tag to indicate that it is the second highest level heading in the document. Each individual comment in the comment file is treated as a separate paragraph by preceding it with a ":p." tag. It then begins a table by issuing the BookMaster table command ":table." Each level 2 entry is given a ":row." tag to indicate that it represents a new row in the table. The first column in the table is WORK ITEM. The BookMaster column tag ":c." is issued followed by the level 2 entry. The comment file for the level 2 entry contains the data for the remaining columns in the table—DESCRIPTION, OWNER, TARGET DATE, and STATUS. The program writes out each preceded by the column tag. This sequence completes a row in the table. This sequence is repeated for each level 2 entry associated with that level 1 entry, filling out the table. The program then issues the end of table tag ":etable." Then it starts a new page by issuing a ".pa" tag and writes out the next level 1 entry, its associated comment file, and its associated table as described above. This continues until all of the level 1 entries have been written. At this point, the ISOPLAN program calls the BookMaster executable program to format the project plan document using the above arranged tags and text. The project plan document is sent to the printer and the file is copied to a designated output directory.

FIGS. 9–13 show sample outputs from the various sessions described above. The information given on the cover sheets of the outputs comply with ISO 9000 requirements such as identifying revision numbers, dates and times to verify currency of the document; sheet numbering to verify completeness; and a version notice to insure that the document holder is aware of essential document updating procedures.

Alternative Embodiments

All of the work described above can be performed by individuals or groups working in traditional fashion, that is, without the aid of a facilitator and groupware tools. Work done by individuals must be reviewed by others in order to assure correctness. Numerous iterations of draft and review are generally required before all parties concur with the decision or document. Facilitated work sessions utilizing groupware tools improve the process by avoiding the iterations and involving the right people up front.

Work done by groups often lacks in quality because of unequal participation among team members. Typically a small percentage of the group dominate the discussions and exert undue influence over the resulting decision or document. Other members of the group may not buy into the resulting decision or document as a result. The implications of this generally don't show up until later on in the registration process, when audits identify non-conformance with the decisions or documented procedures. Again, time is required to sort this out and correct the problem. Rework is often required to document the decision or process so that everyone is in agreement. Facilitated work sessions utilizing groupware tools improve the process by giving everyone an equal voice and gaining consensus up front.

The groupware tools and document management applications (excluding the bridge program) identified in the preceding description of the invention are well known articles of commerce, and are not described in any further detail than that included herein.

It will be appreciated that, although specific embodiments of the invention have been described herein for purposes of illustration, various modifications may be made without departing from the spirit and scope of the invention. Accordingly, the scope of protection of this invention is limited only by the following claims and their equivalents.

We claim:

1. A process comprising:
   inputting comments and ideas for fulfilling ISO 9000 standards using a plurality of input devices, into a computer system as text data in the computer system in an information gathering stage of a team meeting;
   editing the text data on one or more of the input devices into a format suitable for a bridge tool to retrieve and convert the text data and saving the edited data into computer memory data base for ISO 9000 information;
   executing a bridge tool in the computer system for retrieving and converting the stored text data into computer data output with a structure useable by a formatting tool;
   executing the formatting tool for automatically reformatting the computer data output of the bridge tool; and
   the computer system automatically providing at an end of the team meeting, the reformatted computer date for fulfilling ISO 9000 standards in the form of one or more manuals.

2. The process of claim 1, wherein the manuals include educational manuals, quality manuals, work procedures, and management planning documents.

3. The process of claim 1, wherein the information gathering stage captures data required for conforming with an ISO 9000 standard.

4. The process of claim 3, wherein the multi-user collaborative environment includes a networked PC or worksatation data gathering system.

5. The process of claim 3 wherein the information gathering stage is a facilitated data gathering session including:
   a plurality of users having access to a PC or workstation for simultaniously inputting written ideas in response to a facilitator's prompts to be displayed on a secreen visible to the plurality of users;
   means for group editing of the written responses by the plurality of users for forming a group-written response to the facilitator's prompt;
   means for indicating unanimous approval of the group-written response by the plurality of users for forming a final group-written response.

6. The process of claim 1 further including the step of storing the reformatted computer data in a document management tool for maintaining and sharing the comments and ideas.

7. The process of claim 1 wherein the step of executing a bridge tool includes the step of:
   the bridge tool embedding formatting tags in the text data.

8. The process of claim 1 in which the formatting tool is a word processor.

9. A computer system for conducting a group meeting comprising:
   a meeting space for a plurality of attendees and computer facilities having means for receiving, storing, automatically manipulating, and displaying data furnished by the attendees;
   a computer input device for each of a plurality of the attendees for simultaneously inputting responses to questions introduced to the attendees by a group meeting facilitator, the questions introduced to the attendees for facilitating a collection of said data furnished by the attendees and useful in outlining ISO 9000 registration requirements for a preselected organization;
   means for automatically retrieving and reading said data furnished by the attendees including selectively embedding formatting tags, based on said reading, into said data furnished by the attendees;
   means for formatting said data furnished by the attendees into predefined formats stored in the computer facilities in response to the formatting tags; and
   the computer facilities automatically providing manuals in the predefined formats at an end of the group meeting for use by the attendees.

10. A method for quickly establishing and documenting a plan for an organization for fulfilling ISO 9000 standards, the plan established via a facilitated group session wherein participants each input into a computer system data regarding ISO 9000 required organizational processes, the method comprising the steps of:
    providing a group decision support environment for a facilitator and a plurality of participants, the environment including computer system facilities;
    soliciting from the participants information concerning required organizational processes for meeting ISO 9000 standards;
    inputting into the computer system for storage the information concerning ISO 9000 standards solicited from the participants, the step of inputting performed by a plurality of or all the participants;
    reaching concurrence on the correctness of the information to verify the information;
    inputting into the computer system to consolidate the verified information;
    executing one or more programs for converting the verified information stored in the computer system to a format suitable for use by a selected formatting program;
    executing the formatting program for formatting the converted information;
    the formatting program automatically formatting the converted information into predefined formats suitable for efficient interfunctional organization use, the predefined formats including predefined chapter and page headings; and
    automatically providing the information in a form of documents or manuals suitable for use in designing a strategy for fulfilling the ISO 9000 standards.

11. The method according to claim 10, further comprising the step of:

inputting into the computer system organizational process data that affects fulfillment of ISO 9000 standards.

12. The method according to claim 10 wherein the step of executing the formatting program includes the step of:

embedding formatting tags in the data stored in the computer system.

13. A program storage device for use in automatically producing signals to operate a machine, tangibly embodying a program of instructions executable by the machine to perform method steps for producing manuals, said method steps comprising:

receiving into the machine for storage information concerning ISO 9000 standards solicited from, and input by, participants in a group decision support environment, the inputting performed by a plurality of or all the participants;

formatting the information concerning ISO 9000 standards stored in the machine in a format suitable for use by a bridge tool;

executing the bridge tool for retrieving the formatted information concerning ISO 9000 standards from the machine;

the bridge tool reading the formatted information concerning ISO 9000 standards and, in response to the formatted information concerning ISO 9000 standards, selectively embedding formatting tags in the formatted information concerning ISO 9000 standards;

executing a formatting tool for reformatting the formatted information concerning ISO 9000 standards into predefined formats based on the formatting tags, the predefined formats including predefined chapter and page headings; and the bridge program automatically providing the reformatted information in a form of business plan manuals suitable for use in designing a strategy for fulfilling the ISO 9000 standards.

14. An article of manufacture for use in a local area network (LAN) having an operating system and comprising;

a computer usable medium having computer readable program means embodied in said medium, including:

means for receiving into the LAN for storage information concerning ISO 9000 standards solicited from, and input by, participants in the multi-user collaborative group session, the inputting performed by a multiple of or all the participants;

a bridge tool;

means for formatting the information concerning ISO 9000 standards stored in the LAN in a format suitable for use by the bridge tool;

means for executing the bridge tool for retrieving the formatted information concerning ISO 9000 standards from the LAN;

the bridge tool including:

means for reading the formatted information concerning ISO 9000 standards and, in response to the formatted information concerning ISO 9000 standards, selectively embedding formatting tags in the formatted information concerning ISO 9000 standards;

means for executing a formatting tool for reformatting the formatted information concerning ISO 9000 standards into predefined formats based on the formatting tags, the predefined formats including predefined chapter and page headings; and automatically providing printing the reformatted information in a form of business plan manuals suitable for use in designing a strategy for fulfilling the ISO 9000 standards.

15. A method of conducting a group meeting comprising the steps of:

providing a meeting space for a plurality of attendees and computer facilities having means for receiving, storing, automatically manipulating, and displaying data furnished by the attendees;

providing a computer device for each of a plurality of the attendees for simultaniously inputting responses to questions introduced to the attendees by a group meeting facilitator, the questions introduced to the attendees for facilitating a collection of said data furnished by the attendees and useful in outlining ISO 9000 registration requirements for a preselected organization;

automatically retrieving and reading said data furnished by the attendees including selectively embedding formatting tags, based on said reading, into said data furnished by the attendees; and formatting said data furnished by the attendees into predefined formats stored in the computer facilities in response to the formatting tags; and facilitating a collection of said data furnished by the attendees and useful in outlining ISO 9000 registration requirements for a preselected organization;

automatically retrieving and reading said data furnished by the attendees including selectively embedding formatting tags, based on said reading, into said data furnished by the attendees; and formatting said data furnished by the attendees into predefined formats stored in the computer facilities in response to the formatting tags; and the computer system facilities automatically providing manuals in the predefined formats at an end of the group meeting for use by the attendees.

* * * * *